July 25, 1944.                O. K. KJOLSETH                    2,354,522
                            LOAD EQUALIZING SYSTEM
                    Filed Dec. 31, 1941            2 Sheets-Sheet 1
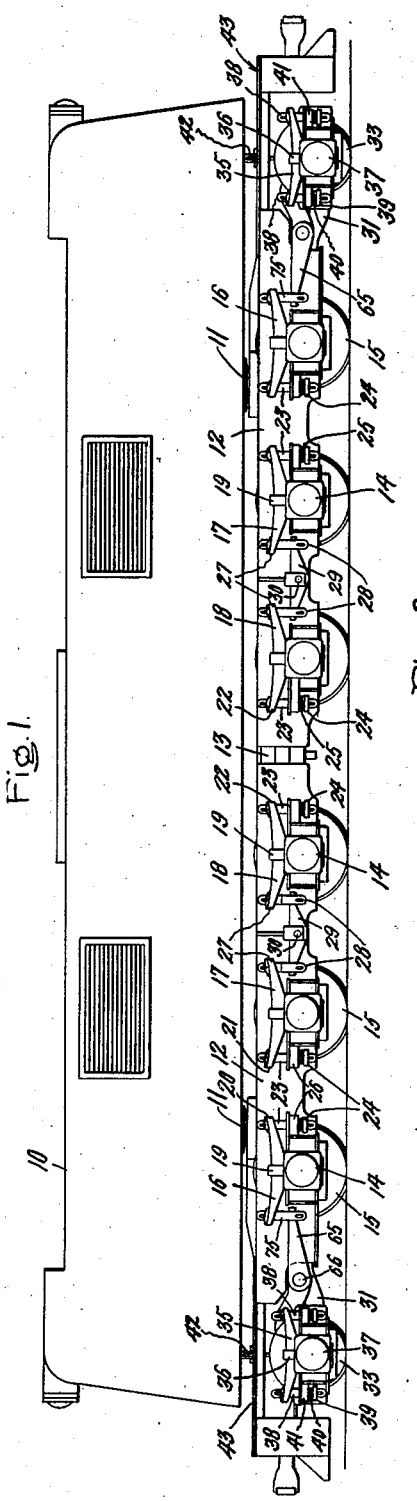
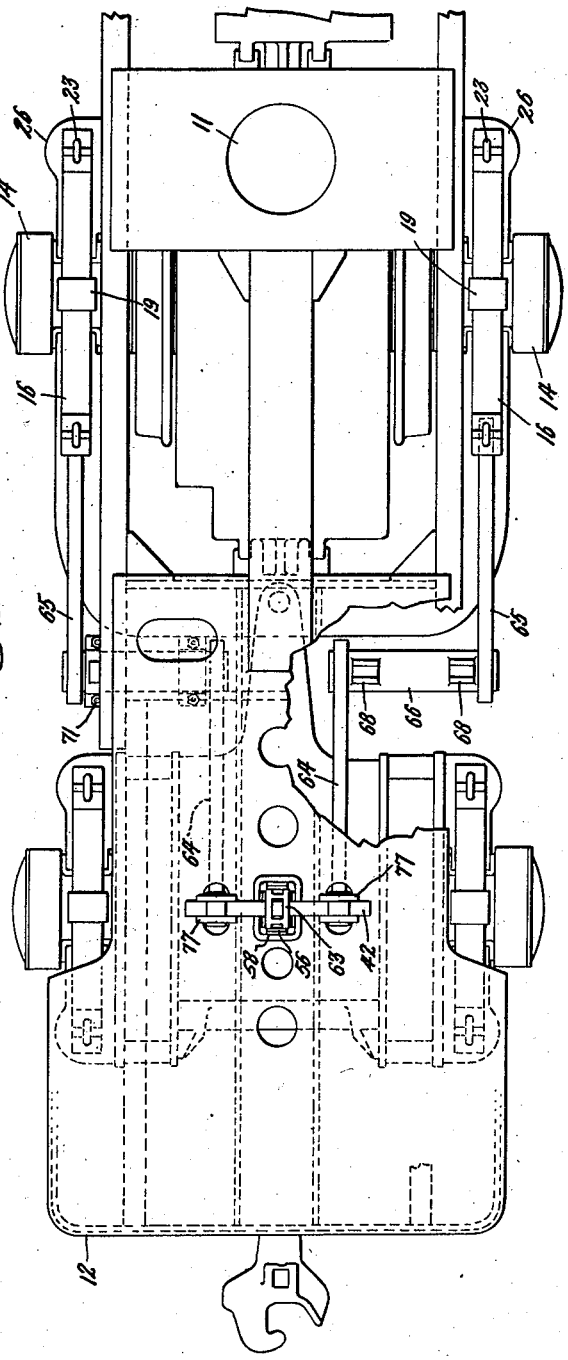
Inventor:
Ole K. Kjolseth,
by Harry E. Dunham
His Attorney.

July 25, 1944.    O. K. KJOLSETH    2,354,522
LOAD EQUALIZING SYSTEM
Filed Dec. 31, 1941    2 Sheets-Sheet 2
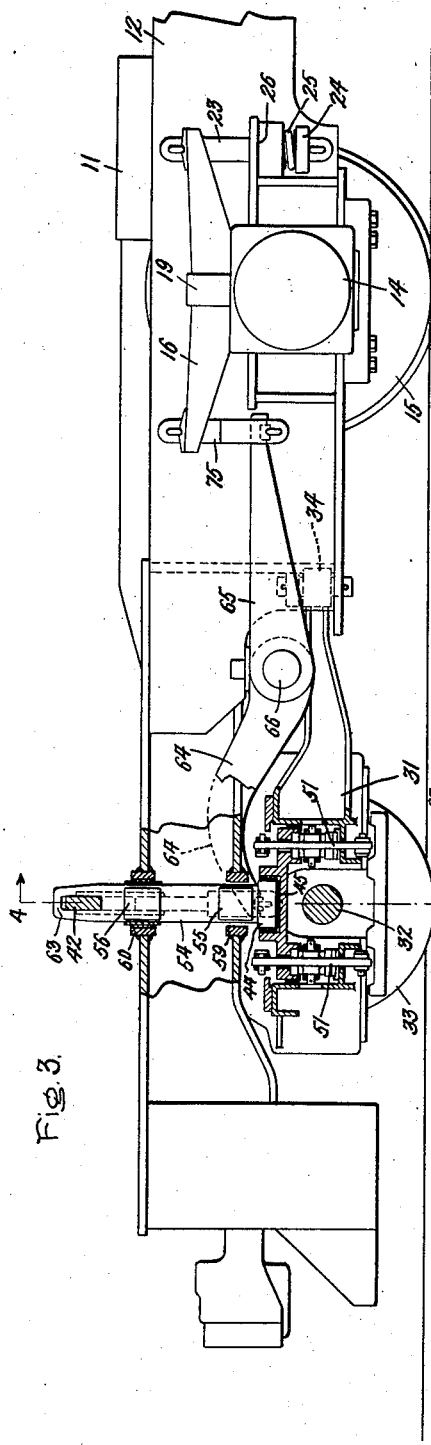
Inventor:
Ole K. Kjolseth,
by Harry E. Dunham
His Attorney.

Patented July 25, 1944

2,354,522

UNITED STATES PATENT OFFICE 2,354,522

LOAD EQUALIZING SYSTEM

Ole K. Kjolseth, Erie, Pa., assignor to General Electric Company, a corporation of New York Application December 31, 1941, Serial No. 425,097

3 Claims. (Cl. 105—82)

My invention relates to load equalizing systems for locomotive or car spring suspension systems.

An object of my invention is to provide an improved load equalizing system for the two sides of a locomotive or car suspension system.

Another object of my invention is to provide an improved transverse load equalizing system for a locomotive or car wherein a part of the weight of the locomotive is transmitted to a guiding truck and the remainder is supported on driving axles.

Further objects and advantages of my invention will become apparent and my invention will be better understood from the following description referring to the accompanying drawings, and the features of novelty which characterize my invention will be pointed out with particularity in the claims annexed to and forming part of this specification.

In the drawings, Fig. 1 is a side elevational view of a locomotive provided with an embodiment of my invention; Fig. 2 is an enlarged plan view, partly broken away, of an end of the supporting structure of the locomotive shown in Fig. 1; Fig. 3 is a side elevational view, partly broken away, of the part of the locomotive shown in Fig. 2; Fig. 4 is a sectional view taken along line 4—4 of Fig. 3; Fig. 5 is an enlarged side view of a part of the longitudinal equalizer and its support shown in Figs. 1 to 4, inclusive; and Fig. 6 is an end view, partly in section, of the portion of the longitudinal equalizer shown in Fig. 5.

Referring to the drawings, I have shown a locomotive having a superstructure 10 supported by any suitable center bearings 11 on articulated driving trucks 12 connected together at their inner adjacent ends by an articulation joint 13. These driving trucks 12 are provided with driving axles mounted in journal boxes 14 and supported by driving wheels 15. The trucks 12 are supported on the axles through a side spring suspension system which includes longitudinally extending spring members 16, 17 and 18 arranged on each side of the locomotive and provided with spring straps 19 which are mounted on the upper sides of the journal boxes 14 for supporting the springs on the journal boxes. The ends 20, 21, and 22 of the longitudinal spring members 16, 17, and 18, respectively, support a part of the weight of the locomotive on the driving trucks 12 through spring hangers 23 which are provided with spring seats 24 at the lower ends thereof for supporting coil springs 25 arranged in engagement with upper spring seats 26 formed as a part of the side frames of the driving trucks 12. The adjacent ends 27 of the longitudinal spring members 17 and 18 are connected by spring hangers 28 to the ends of a longitudinally extending equalizer 29 pivotally secured by a supporting pivot pin 30 to each respective side frame of the driving trucks 12. A single axle guiding truck provided with a swivel truck frame 31 is arranged at each end of the locomotive and is supported through a guiding truck axle 32 on wheels 33. The inner end of each truck frame 31 is pivotally secured by a swivel joint 34 to the main driving truck frame 12. Each truck is provided with a longitudinally extending spring 35 having a spring strap 36 mounted on the upper side of an axle journal box 37 on each side of the guiding truck. The ends of the longitudinally extending springs 35 support the truck frame on the journal boxes through spring hangers 38 provided with spring seats 39 at their lower ends thereof on which coil springs 40 are mounted in engagement with upper spring seats 41 formed as a part of the guiding truck frame 31.

In this type locomotive it is desirable that the guiding trucks should carry a part of the weight of the locomotive in order to provide a desired guiding effort through these trucks to the main driving trucks, and it also is desirable that some arrangement be provided for equalizing the load transversely of the locomotive to equalize the tractive effort exerted by the driving wheels on each side of the locomotive. In order to provide these desired results, a transverse load equalizing system is provided which includes a transverse equalizer 42 arranged above the platform structure 43 of each of the driving trucks 12 which is adapted to be connected to the side spring suspension system on each side of the locomotive and to be supported on the guiding truck 31 through a center plate 44 and center plate extension 54 vertically movable relative to platform structure 43 of the driving trucks 12. This center plate is supported on a center bearing 45 which is mounted on a laterally movable supporting plate 46 having cam surfaces 47 in engagement with rollers 48 supported on relatively stationary cam surfaces 49 mounted on the guiding truck frame 31. The rollers 48 are connected together by a transversely extending frame 50 to which is pivotally secured an upwardly extending link 51 which is secured through an arm 52 to the center bearing 45 and through an arm 53 to the guiding truck frame 31. In this manner, whenever there is a tendency for the center plate 44 to move laterally relative to the truck frame 31, the cam surfaces 47 will tend to move upwardly over the rollers 48 and the rollers 48 will tend to move upwardly over the cam surfaces 49, thereby exerting a restraining force on the center bearing 45 providing, through the platform structure 43 of the driving truck 12, a graduated guiding effort to the wheels of the driving truck 12 and will tend to return it to its normally centered position relative to the guiding truck frame 31. The center plate 44 is provided with an upwardly extending substantially rectangular stem 54 having bearing element surfaces 55 and 56 arranged on the sides thereof in engagement with the complementary bearing surfaces 57 and 58, respectively, mounted in substantially rectangular openings formed in collars 59 and 60 of the driving truck frames 12. This substantially rectangular stem is provided with a double rocker fulcrum supporting element 61 on the upper end thereof arranged in engagement with a double rocker fulcrum bearing seat 62 mounted on the transverse equalizer 42 for supporting the equalizer through the center plate stem on the center plate so as to transfer part of the weight of the locomotive which is carried by the transverse equalizer through the center plate 44 to the guiding truck 31. The double rocker fulcrum support for the transverse equalizer 32 tends to prevent tilting of the transverse equalizer and to return it to a normally centered position relative to the supporting fulcrum element 61. The center plate supporting stem 54 is formed at its upper end as a guard yoke 63 which extends over the central portion of the transverse equalizer 42 to prevent its accidental displacement from its support on the center plate stem fulcrum element 61.

In order to equalize the load transversely of the two sides of the locomotive and to transmit a part of the weight of the locomotive to the transverse equalizer 42, a longitudinally extending equalizer element is provided on each side of the locomotive which includes a pair of substantially parallel longitudinally extending equalizer crank arms 64 and 65 rigidly secured together at their adjacent ends to a transversely extending torsion shaft 66 which is provided with a pair of supporting bearings 67 arranged between bearing seats 68 and 69 on the torsion shaft 66 and the driving truck frame 12 for supporting part of the weight of the locomotive directly on the equalizer through the shaft 66 as shown in detail in Fig. 5. Guard straps 70 are arranged about the torsion shaft 66 and are secured by bolts 71 to the underside of the driving truck frame 12 to prevent accidental displacement of the torsion shaft 66 relative to its bearings 67 and the truck frame 12. A stop plate 72 is secured to the inner end 73 of each torsion shaft 66 and is arranged to extend upwardly about the lower end of a downwardly extending stop plate 74 secured to the truck frame 12 to prevent accidental transverse displacement of the torsion shaft 66 relative to the truck frame 12. One end of the longitudinally extending equalizer is adapted to be supported on a driving axle through the side spring suspension system of the locomotive by connecting the free outer end of the longitudinal equalizer arm 65 to the adjacent end of the longitudinally extending spring member 16 through a spring hanger 75. In this manner each of the longitudinally extending equalizer members is resiliently supported on a journal box and is adapted to transmit a part of the load of the locomotive from the torsion shaft 66 through the arm 65 to the driving axle at the end of the locomotive adjacent the guiding truck and through a spring hanger 23 to the main driving truck frame 12. The forward or outer end of each longitudinally extending equalizer arm 64 is supported on a bearing member 76 mounted on a suspension link member 77 provided with a double fulcrum rocker element 78 at its upper end which engages a complementary double fulcrum bearing seat 79 mounted on an end of the transverse equalizer 42. The double fulcrum supports for the longitudinally extending equalizer members on the transverse equalizer 42 further minimize the tendency of the transverse equalizer 42 to tilt or rock relative to the longitudinally extending equalizers and the driving truck 12 and provide restraining forces which tend to center this portion of the load equalizing system. This equalizing system also provides for cross and longitudinal equalization of shocks received by the wheels and for an even distribution of load between the drivers, and the auxiliary guiding trucks combined with a plurality of side supports for the driving trucks on the suspension system afford a marked degree of lateral stability which is desirable in this type locomotive construction.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A transverse load equalizing system for a locomotive having a guiding truck and a main driving truck with a driving axle which includes a longitudinally extending spring member on each side of said driving truck supported on said driving axle, a transverse equalizer having a central double fulcrum seat, means including a center plate on said guiding truck for supporting a part of the weight of said locomotive thereon, means including a double fulcrum supported on said center plate and arranged in engagement with said transverse equalizer central double fulcrum seat for supporting said transverse equalizer, an end double fulcrum seat adjacent each end of said transverse equalizer, a longitudinally extending equalizer member arranged on each side of said locomotive, means for supporting one end of each of said longitudinally extending equalizer members on said longitudinal spring members, means including a double fulcrum element for supporting the other end of each of said longitudinal equalizer members on said transverse equalizer and double fulcrum seats, and means for supporting a part of the weight of said locomotive on said longitudinally extending equalizer members.

2. A transverse load equalizing system for a locomotive having a guiding truck and a main driving truck with a driving axle which includes a longitudinally extending spring member on each side of said driving truck supported on said driving axle, a transverse equalizer having a central double fulcrum seat, means including a center plate on said guiding truck for supporting a part of the weight of said locomotive thereon, means including a double fulcrum supported on said center plate and arranged in engagement with said transverse equalizer central double fulcrum seat for supporting said transverse equalizer, a longitudinally extending equalizer member arranged on each side of said locomotive, means for supporting one end of each of said longitudinally extending equalizer members on said longitudinal spring members, means for supporting the other end of each of said longitudinal equalizer members on said transverse equalizer, and means for supporting a part of the weight of said locomotive directly on said longitudinally extending equalizer members.

3. A transverse load equalizing system for a locomotive having a guiding truck and a main driving truck with a driving axle which includes a longitudinally extending spring member on each side of said driving truck supported on said driving axle, a transverse equalizer, means including a center plate on said guiding truck for supporting a part of the weight of said locomotive on said guiding truck, means including a double fulcrum for supporting said transverse equalizer on said center plate, an end double fulcrum seat adjacent each end of said transverse equalizer, a longitudinally extending equalizer member arranged on each side of said locomotive, means for supporting one end of each of said longitudinal equalizer members on said longitudinal spring members, means including a double fulcrum element for supporting the other end of each of said longitudinal equalizer members on said transverse equalizer end double fulcrum seats, and means for supporting a part of the weight of said locomotive on said longitudinally extending equalizer members.

OLE K. KJOLSETH.